United States Patent
Cox

(10) Patent No.: US 11,102,068 B1
(45) Date of Patent: Aug. 24, 2021

(54) SYSTEMS AND METHODS TO CONFIGURE PIN PAD FOR MICROPROCESSOR-ENABLED AND CONTACTLESS PAYMENT VEHICLES

(71) Applicant: Worldpay, LLC, Symmes Township, OH (US)

(72) Inventor: Bryan Cox, Chandler, AZ (US)

(73) Assignee: Worldpay, LLC, Symmes Township, OH (US)

( * ) Notice: Subject to any disclaimer, the term of this patent is extended or adjusted under 35 U.S.C. 154(b) by 103 days.

(21) Appl. No.: 16/225,317

(22) Filed: Dec. 19, 2018

(51) Int. Cl.
*H04L 12/24* (2006.01)
*G06Q 20/32* (2012.01)
*G06Q 20/20* (2012.01)
*H04L 29/08* (2006.01)

(52) U.S. Cl.
CPC ......... *H04L 41/082* (2013.01); *G06Q 20/204* (2013.01); *G06Q 20/3278* (2013.01); *H04L 67/34* (2013.01)

(58) Field of Classification Search
CPC ..... H04L 41/082; H04L 67/34; G06Q 20/204; G06Q 20/3278
See application file for complete search history.

(56) References Cited

U.S. PATENT DOCUMENTS

| 10,372,440 B1* | 8/2019 | Koeppel | H04L 9/083 |
| 2005/0239447 A1* | 10/2005 | Holzman | H04W 12/0608 455/414.3 |
| 2008/0319867 A1* | 12/2008 | Rosenberg | G06Q 20/1235 705/26.41 |
| 2015/0271150 A1* | 9/2015 | Barnett | H04L 63/0876 713/171 |
| 2015/0339665 A1* | 11/2015 | Hayhow | G06Q 20/38 705/71 |
| 2016/0260072 A1* | 9/2016 | Badger | G06Q 20/26 |
| 2016/0380981 A1* | 12/2016 | Arora | G06Q 20/34 713/168 |
| 2017/0200157 A1* | 7/2017 | Bergeon | G06Q 20/356 |

* cited by examiner

*Primary Examiner* — Todd L Barker
(74) *Attorney, Agent, or Firm* — Bookoff McAndrews, PLLC

(57) ABSTRACT

A method of network configuration of a personal identification number (PIN) pads includes receiving a request to upgrade a PIN pad from a merchant or an individual software vendor (ISV) to read microprocessor-enabled or contactless payment vehicles, retrieving a PIN pad configuration hash value from the PIN pad, obtaining current configuration using the hash value, sending instructions to the PIN pad to upgrade the PIN pad over a network if the PIN pad is capable of reading microprocessor-enabled or contactless payment vehicles, and downloading and installing drivers to enable PIN pad readers to read and process at least one of the microprocessor-enabled payment vehicles and contactless payment vehicles according to the instructions. The method further performs additional operations such as updating the PIN pad registry with the PIN pad configuration and enabling the PIN pad to read the microprocessor-enabled or contactless payment vehicles.

20 Claims, 5 Drawing Sheets ately, and a PIN pad may not operate correctly if an out-of-date configuration is in use. Configuring the PIN pad devices to accept payment vehicles involving latest technology may be complex and time consuming and/or may be performed by systems outside of the merchant's environment.

SYSTEMS AND METHODS TO CONFIGURE PIN PAD FOR MICROPROCESSOR-ENABLED AND CONTACTLESS PAYMENT VEHICLES

TECHNICAL FIELD

Various embodiments of the present disclosure relate generally to electronic payment processing and, more particularly, to managing the configuration of personal identification number (PIN) pad terminals associated with a merchant point of sale (POS).

BACKGROUND

Traditionally, merchants and other store owners have point of sale (POS) terminals that can accept check or payment card from consumers for goods and services. Such POS systems may include PIN pads at which a consumer may enter payment and/or personal information in order to complete payment processing requests for purchases. PIN pads may be controlled according to configurations relating to user interaction, connections to merchant and/or payment processor systems and networks, security and authentication, etc. The types of payment vehicles containing new mechanisms such as embedded microprocessor chips to securely pay using the PIN pad are rapidly increasing. Similarly, PIN pad devices may need to be upgraded to accept contactless payment from smart phones. Upgrading a PIN pad for payment vehicles embedded with microprocessors (e.g., EMV chip payment cards) and contactless configuration, may require independent software vendors (ISVs) or merchants to manually load these configurations on the PIN pad devices. Such configurations may be updated periodically, and a PIN pad may not operate correctly if an out-of-date configuration is in use. Configuring the PIN pad devices to accept payment vehicles involving latest technology may be complex and time consuming and/or may be performed by systems outside of the merchant's environment.

Manually upgrading and installing these configurations on the PIN pad may prevent the PIN pad from being available to a merchant for a substantial amount of time, causing frustration, and dissatisfaction to the merchant and consumers, and possibly leading to a loss of revenue for the merchant. Additionally, merchants may want to enable or disable service to accept the microprocessor-enabled payment vehicles or contactless payment without having to manually change settings of the PIN pad. For example, there may be circumstances in which a contactless service is not working properly or the PIN pad is not able to read the microprocessor-enabled payment vehicles. In such scenarios, ISVs or merchants would like to disable such services on the PIN pad right away without having to manually change settings on the PIN pad.

Accordingly, there is a need for systems and methods that allows the PIN pad to request, receive, and install a new upgrades and up-to-date configuration automatically over wireless network without removing PIN pad from its current setting at the merchant.

The present disclosure is directed to overcoming one or more of these above-referenced challenges.

SUMMARY OF THE DISCLOSURE

According to certain aspects of the disclosure, systems and methods are disclosed for configuring personal identification number (PIN) pads for microprocessor-enabled and contactless payment vehicles.

In one embodiment, a computer-implemented method is disclosed for configuring a PIN pads for microprocessor-enabled payment vehicles and contactless payment vehicles. The method includes: receiving, from a point of sale system over a computer network, a request to upgrade a PIN pad for reading at least one of a microprocessor-enabled payment vehicle and a contactless payment vehicle, retrieving a PIN pad configuration hash value from the PIN pad, further obtaining, using a configuration processor, current configuration information associated with the PIN pad configuration hash value from a PIN pad registry, and evaluating, using the configuration processor, whether the PIN pad is capable of reading at least one of the microprocessor-enabled payment vehicle and the contactless payment vehicle.

In the above illustrated embodiment, the computer-implemented method for configuring the PIN pads for microprocessor-enabled payment vehicles and contactless payment vehicles further includes: generating, upon determining that the PIN pad is capable of reading at least one of the microprocessor-enabled payment vehicle and the contactless payment vehicle, using the configuration processor, configuration instructions to upgrade the PIN pad for reading at least one of the microprocessor-enabled payment vehicle and the contactless payment vehicles; sending, over the computer network, the configuration instructions to the PIN pad to upgrade the PIN pad for reading at least one of the microprocessor-enabled payment vehicle and the contactless payment vehicle; and configuring, using a hardware processor of the PIN pad, at least one of PIN pad readers to read and process at least one of the microprocessor-enabled payment vehicle and the contactless payment vehicle according to the configuration instructions.

In the above exemplary embodiment, the method further includes: updating, using the configuration processor, the PIN pad's current configuration information in the PIN pad registry; generating, at the PIN pad registry, a new hash for the updated PIN pad configuration; and transmitting the new hash to the PIN pad to be stored at the PIN pad. The method further includes sending, as a result of evaluating that the PIN pad is upgraded for at least one of the microprocessor-enabled payment vehicles and contactless payment vehicles, using the configuration processor, a notification that the PIN pad is ready is sent to the point of sale system, setting a state of the PIN pad as ready.

In accordance with another embodiment, the method further includes: sending, upon determining that the PIN pad cannot be upgraded for reading at least one of the microprocessor-enabled payment vehicle and the contactless payment vehicle, using the configuration processor, a notification to the point of sale system.

In accordance with another embodiment, a method for enabling a PIN pads for microprocessor-enabled payment vehicles and contactless payment vehicles, the method includes: receiving, from a point of sale system, over a computer network, a request to enable a PIN pad for reading at least one of a microprocessor-enabled payment vehicle and a contactless payment vehicle; retrieving, over the computer network, a PIN pad configuration hash value from the PIN pad; obtaining, using a configuration processor, current configuration information associated with the PIN pad configuration hash value from a PIN pad registry; and evaluating, using the configuration processor, whether the PIN pad is configured and disabled for reading at least one of the microprocessor-enabled payment vehicle and the contactless payment vehicles.

In the above illustrated embodiment, the method further includes: generating, as a result of determining that the PIN pad is configured and disabled to read at least one of the microprocessor-enabled payment vehicle and the contactless payment vehicle, instructions to enable the PIN pad for reading at least one of the microprocessor-enabled payment vehicles and contactless payment vehicles; sending, over the computer network, configuration instructions to the PIN pad to enable the PIN pad for reading at least one of the microprocessor-enabled payment vehicle and the contactless payment vehicle; enabling, using a hardware processor of the PIN pad, PIN pad readers to read and process at least one of the microprocessor-enabled payment vehicle and the contactless payment vehicle according to the configuration instructions; and accepting, at least one of the microprocessor-enabled payment vehicle and the contactless payment vehicle at the enabled PIN pad. In the above exemplary embodiment, the method further includes: updating, using the configuration processor, the PIN pad's current configuration; generating, using the configuration processor, a new hash for the updated PIN pad configuration; and transmitting the new hash to the PIN pad to be stored at the PIN pad.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that multiple parties may fully utilize their data without allowing others to have direct access to raw data. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to electronic payment infrastructure and to managing the configuration of personal identification number (PIN) pad terminals associated with a merchant point of sale (POS) environment.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
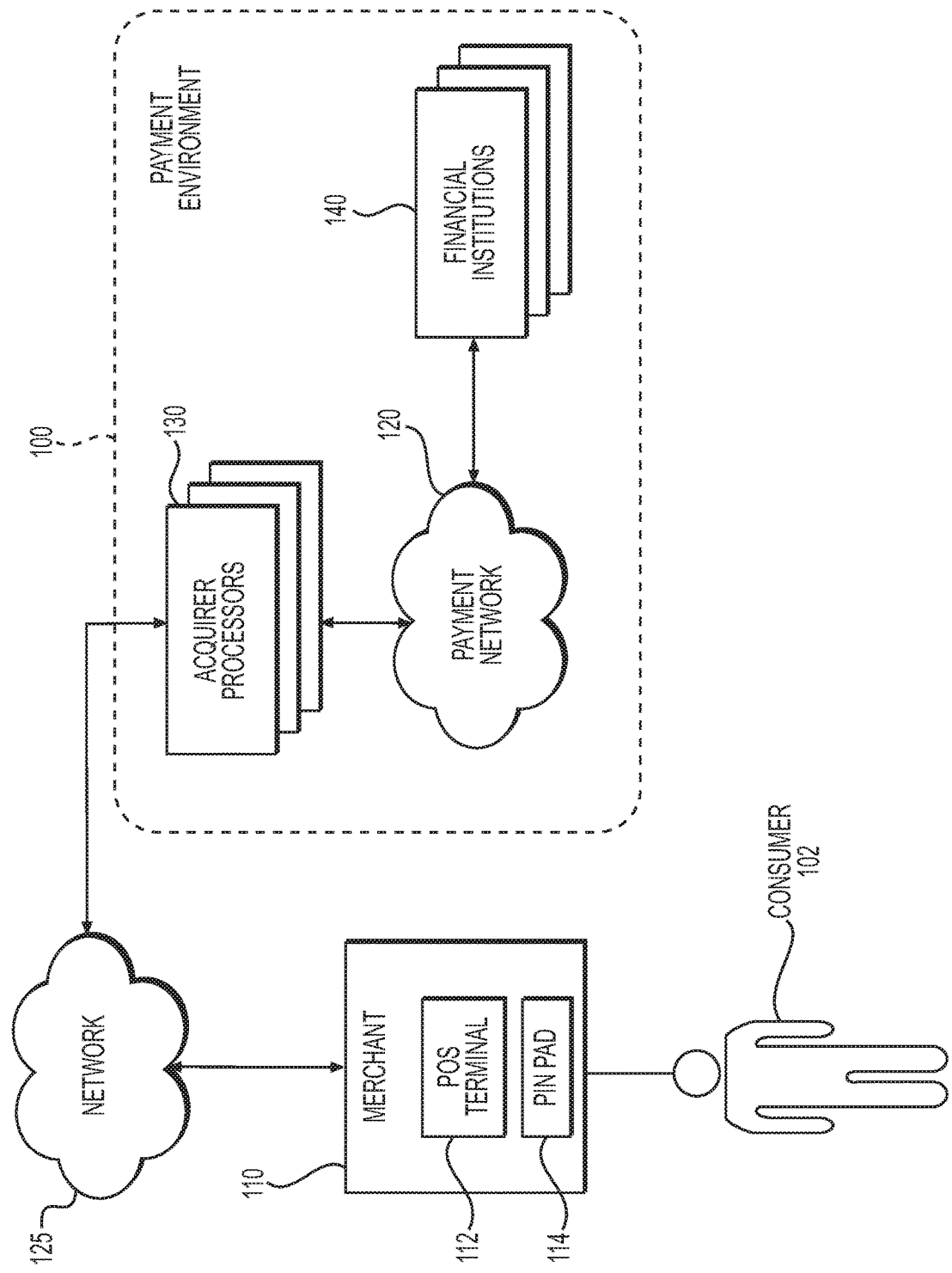
FIG. 1 depicts a block diagram of a electronic payment processing system.
Figure 2:
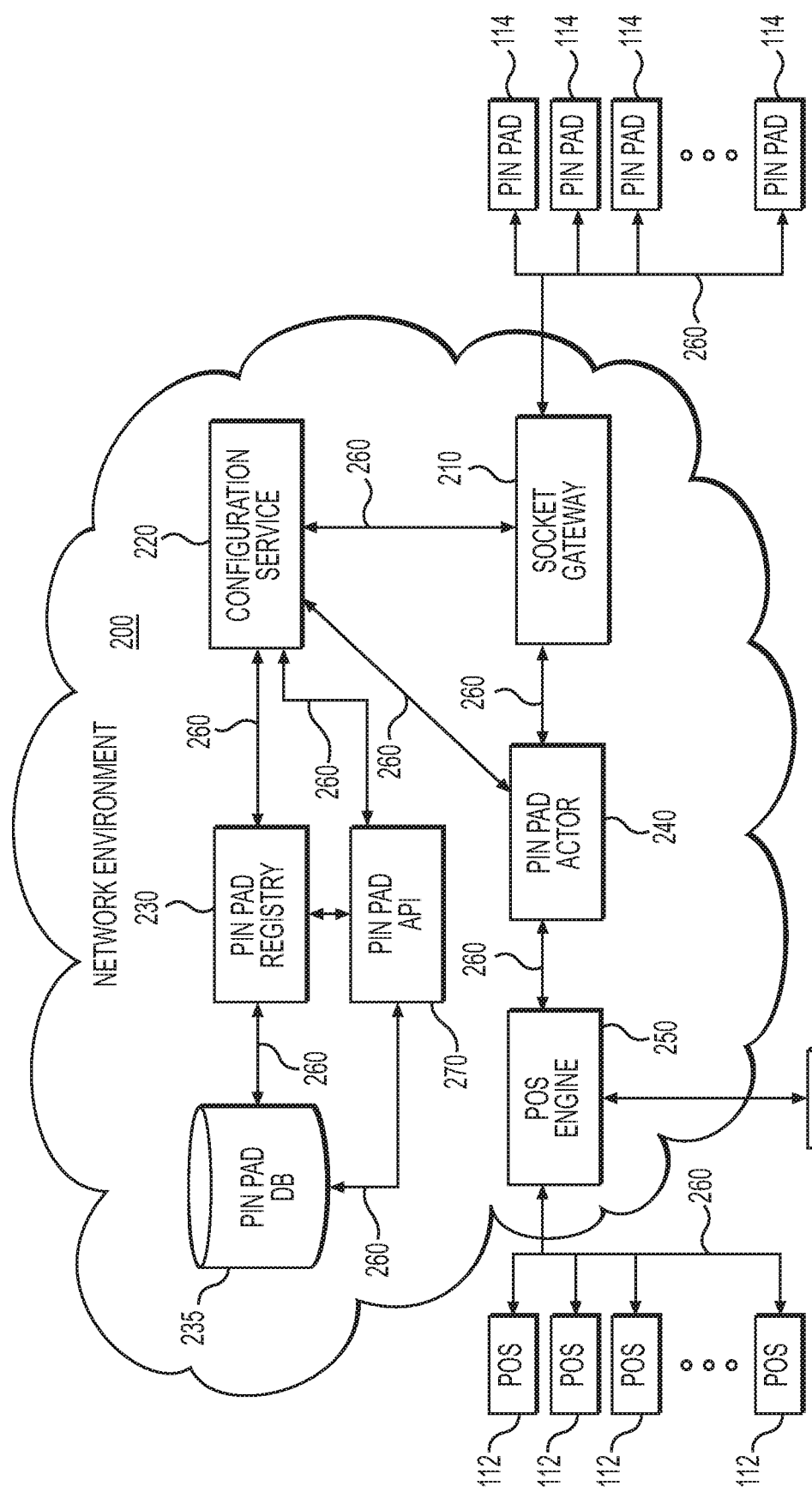
FIG. 2 depicts an exemplary system infrastructure for PIN pad configuration using a computer network, according to one or more embodiments.

Turning to FIG. 1, traditionally, in an electronic payment processing system, a consumer 102, during the checkout process at a merchant 110, may pay for goods or services at merchant 110 on a PIN Pad 114 connected with a POS terminal 112. Consumer 102 may use a payment card for payment and the transaction may be processed through a payment environment 100. Consumer 102 may submit payment information at PIN Pad 114 connected to POS terminal 112 of merchant 110, such as by swiping his or her payment card, inserting his or her chip-based payment card, through wireless near field communication (NFC), etc., or by any other suitable means. PIN Pad 114 sends a payment request by way of a computer network 125 to an acquirer processor 130. Alternatively, such a request may be sent by a component that controls a flow of a transaction, such as a point of sale (POS) engine 250, as depicted in FIG. 2. Acquirer processor 130 may request, by way of payment network 120, an electronic transfer of funds from the received funds to the financial institution 140 associated with merchant 110. Merchant 110 may provide an infrastructure for processing electronic payment requests.

FIG. 2 depicts an exemplary system infrastructure for configuring PIN pad 114 using network environment, according to one or more embodiments. As shown in FIG. 2, an infrastructure 200 processing electronic payment requests may include one or more point of sale (POS) devices 112, which may be in communication with a POS engine 250, and one or more personal identification number (PIN) pad terminals 114, which may be in communication with a socket gateway 210. In one or more embodiments, an ISV 280 may be in communication with POS engine 250 for the purposes of configuring PIN pad terminals 114. POS engine 250 may be embodied, for example, as middleware that may command and control the PIN pad and may send a payment request. This may be embodied as a semi-integrated solution and may further control the PIN pad 114 on behalf of the POS device software. Such control may include controlling a transaction flow or sequence including, for example, prompting for payment card swipe or insert, sending a transaction request for authorization, prompting for a consumer signature, etc. Infrastructure 200 may further include a PIN pad actor 240, a configuration service 220, a PIN pad registry 230 and a PIN pad database 235. Socket gateway 210 may send commands to one or more PIN pad(s) and may receive responses from the PIN pad(s). PIN pad actor 240 may provide a virtual representation of the PIN pad 114 and may maintain a current state of the PIN pad 114. Configuration service 220 may, if necessary, configures the PIN pad 114 upon connection of the PIN pad 114 to the infrastructure. PIN pad registry 230 and PIN pad database 235 maintain configuration data associating each PIN pad 114.

According to one or more embodiments, the components of infrastructure 200 may be connected by a computer network 260, such as, for example a local area network (LAN) or a wireless network, such as, for example, a WiFi network. However, other network connections among the components of infrastructure 200 may be used, such as, for example, a wide area network (WAN), the internet, or the cloud. According to one or more embodiments, the components of infrastructure 200 may operate to maintain a configuration of PIN pads 114. Methods of configuring PIN pads 114 according to one or more embodiments will be discussed with respect to FIGS. 3-5 below. Functions of the components of infrastructure 200 will be described below with respect to exemplary methods for network configuration of PIN pads.

Any suitable system infrastructure may be put into place for network configuration of PIN pads. FIGS. 1 and 2 and the discussion above provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1 and 2. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 3:
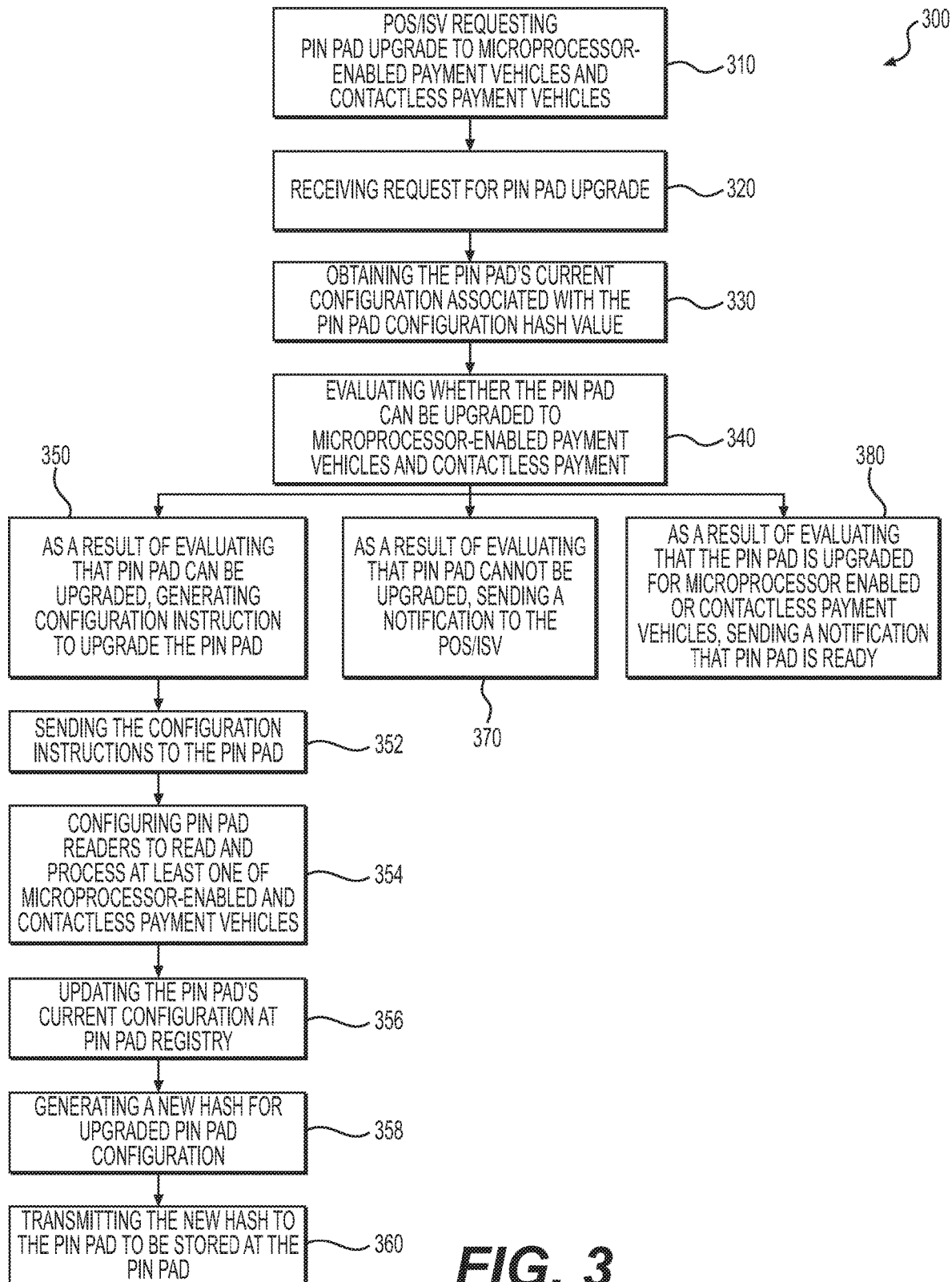
FIG. 3 depicts a flowchart of a method for network configuration of PIN pads, according to one or more embodiments.

FIG. 3 illustrates a method for configuring PIN pads for microprocessor-enabled payment vehicles and contactless payment vehicles. In operation 310, POS 112 or ISV 280 may request an upgrade for PIN pad 114 to enable support for microprocessor-enabled or contactless payment vehicles. The request to upgrade the PIN pad configuration may be received at configuration service 220 through POS engine 250 and PIN pad actor 240 according to operation 320. In operation 330, configuration service 220 may obtain a current PIN pad configuration from the PIN pad 114 through socket gateway 210. The configuration service 220 may obtain the current PIN pad configuration information based on a PIN pad configuration hash value. The PIN pad configuration information obtained from PIN pad 114 may be stored in a PIN pad database 235 by PIN pad registry 230. Configuration service 220 may further evaluate whether the PIN pad 114 can be upgraded to be capable of reading at least one of the microprocessor-enabled payment vehicles or contactless payment vehicles according to operation 340.

In the above exemplary embodiment, the configuration service 220 may evaluate in operation 340 whether the PIN pad is capable of reading at least one of the microprocessor-enabled payment vehicles and contactless payment vehicles and whether the PIN pad is configured to read the at least one of microprocessor-enabled or contactless payment vehicles. In operation 350, upon determining that the PIN pad may be upgraded to read the at least one of microprocessor-enabled or contactless payment vehicles, the configuration service 220 may generate instructions to upgrade the PIN pad and may send the instructions to the PIN pad using socket gateway 210 in operation 352. PIN pad 114 may receive the instructions and may configure the PIN pad readers to read and process the microprocessor-enabled and contactless payment vehicles according to operation 354. Configuration operation 354 may include downloading and installing, over the computer network, drivers to enable at least one of PIN pad readers to read and process at least one of the microprocessor-enabled payment vehicles and contactless payment vehicles according to the provided instructions.

Once PIN pad 114 is configured to accept microprocessor-enabled and contactless payment vehicles, the configuration service 220 may update the PIN pad's current configuration information in the PIN pad registry in operation 356. In operation 358, configuration service 220 may further generate a new hash for the upgraded PIN pad configuration in operation 358. In operation 360, configuration service 220 may further transmit the new hash to the PIN pad to be stored on the PIN pad 114.

In an another embodiment, upon determining that the current version of PIN pad 114 cannot be upgraded to be capable of reading microprocessor-enabled or contactless payment vehicles, configuration service 220 may send notification to POS 112 or to ISV 280, or both.

In a yet another example embodiment, upon determining that the PIN pad 114 is already upgraded for microprocessor-enabled payment vehicles or contactless payment vehicles, configuration service 220 may provide notification to POS 112 or to ISV 280, or both, that PIN pad 114 is in ready state and is upgraded for at least one of the microprocessor-enabled payment vehicles and contactless payment vehicles. In the above example embodiments, the configuration service 220 may comprise one or more configuration processor(s) and PIN pad 114 may comprise one or more hardware processor(s).

Figure 4:
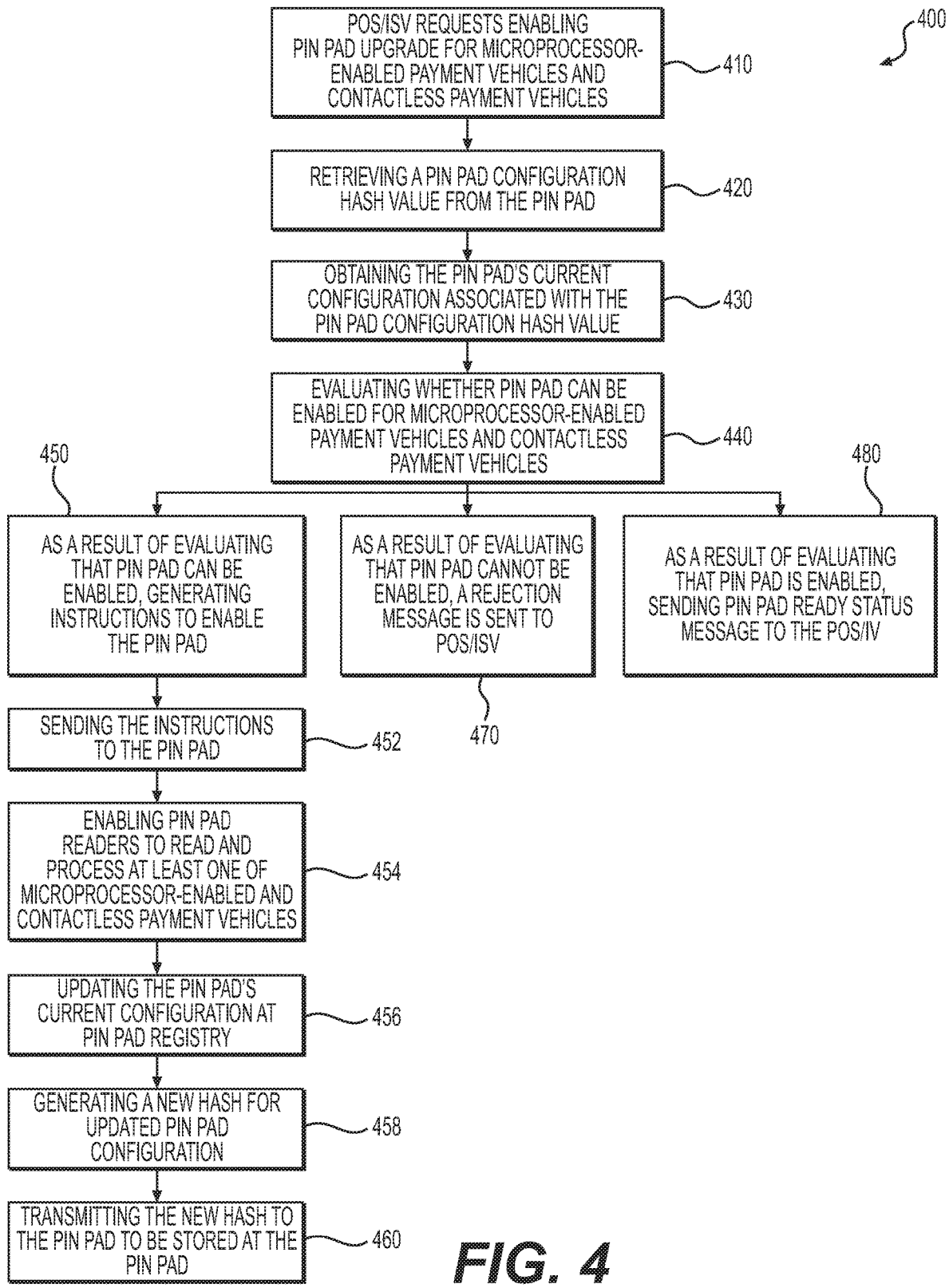
FIG. 4 depicts a flowchart of a method for enabling network configuration of PIN pads, according to one or more embodiments.

FIG. 4 illustrates a method for enabling the PIN pads for microprocessor-enabled payment vehicles and contactless payment vehicles. In operation 410, POS 112 or ISV 280 may request enabling PIN pad 114 to support microprocessor-enabled payment vehicles and contactless payment vehicles. Configuration service 220, may receive the request from POS 112 or ISV 280 through POS engine 250 and PIN pad actor 240 to enable the PIN pad to accept at least one of microprocessor-enabled payment vehicles and contactless payment vehicles. At operation 420, configuration service 220 may retrieve a PIN pad configuration hash value from PIN pad 114 through socket gateway 210. In operation 430, the configuration service 220 may obtain the current configuration associated with the PIN pad configuration hash value. In operation 440, configuration service 220 may determine whether PIN pad 114 is configured for reading at least one of the microprocessor-enabled payment vehicles and contactless payment vehicles but that such capability is disabled.

In operation 450, upon determining that PIN pad 114 is configured for reading at least one of the microprocessor-enabled payment vehicles and contactless payment vehicles but that such capability is disabled, configuration service 220 may generate instructions to enable PIN pad 114 for reading at least one of microprocessor-enabled payment vehicles and contactless payment vehicles. Configuration service 220 may send the instructions to enable PIN pad 114 for reading at least one of microprocessor-enabled payment vehicles and contactless payment vehicles, over the computer network, according to operation 452.

In operation 454, after receiving instructions to enable PIN pad 114 for reading at least one of microprocessor-enabled payment vehicles and contactless payment vehicles, over the computer network, the hardware processor of PIN pad 114 may enable PIN pad 114 readers to read and process at least one of microprocessor-enabled payment vehicles and contactless payment vehicles. Once PIN 114 pad is enabled for reading at least one of microprocessor-enabled payment vehicles and contactless payment vehicles, PIN pad 114 may begin accepting at least one of the microprocessor-enabled payment vehicles and contactless payment vehicles at enabled PIN pad 114.

In operation 456, once PIN pad 114 is enabled for reading at least one of microprocessor-enabled payment vehicles and contactless payment vehicles, configuration service 220 may update the current configuration information for PIN pad 114 in PIN pad registry 230. PIN pad registry 230 may generate a new hash for the enabled configuration for PIN pad 114 in operation 458. Furthermore, configuration service 220 may transmit the new hash to PIN pad 114 to be stored at PIN pad 114 in operation 460.

In an exemplary embodiment, upon determining that PIN pad 114 cannot be enabled for reading at least one of the microprocessor-enabled payment vehicles and contactless payment vehicles, configuration processor 220 may send a notification to POS 112 or to ISV 280, or both.

In a yet another embodiment, upon determining that PIN pad 114 is enabled for reading at least one of the microprocessor-enabled payment vehicles and contactless payment vehicles, configuration processor 220 may provide notification to POS 112 or to ISV 280, or both, that PIN pad 114 is in a ready state and is enabled for reading at least one of the microprocessor-enabled payment vehicles and contactless payment vehicles.

In the above illustrated embodiment, the microprocessor-enabled payment vehicles may include, for example, payment cards using computer chips to authenticate transactions according to Europay, MasterCard, and Visa (EMV) global standard. The contactless payment vehicles may include, for example, either EMV or NFC compatible payment cards. The PIN pad configuration information may be stored in a PIN pad database 235 by a PIN pad registry 230.

Figure 5:
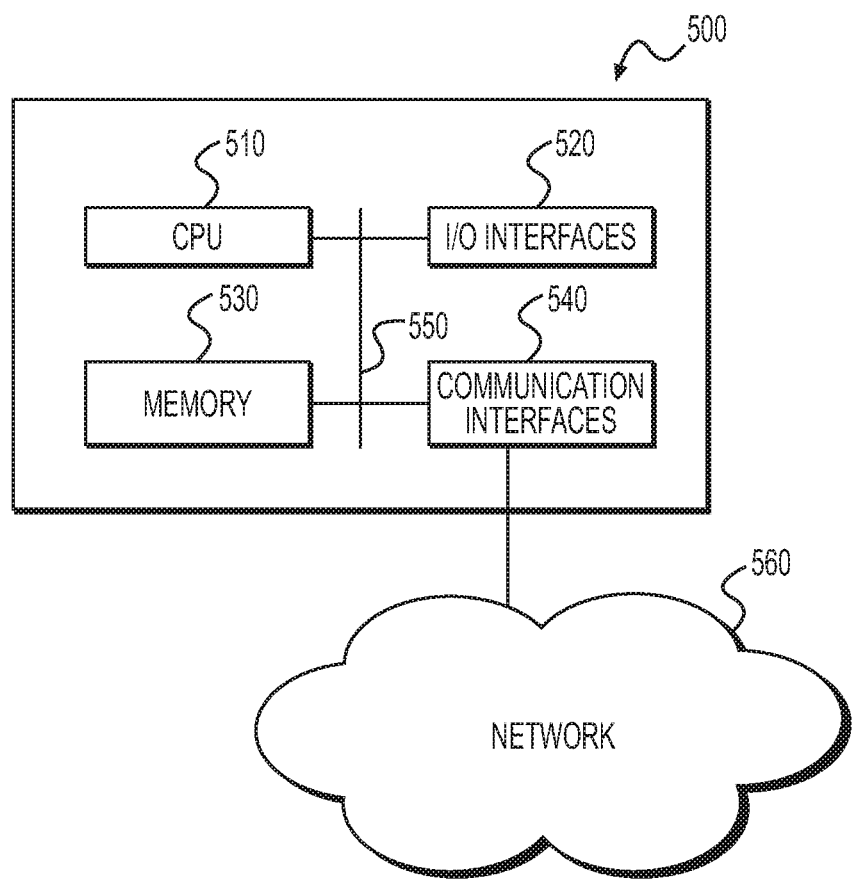
FIG. 5 is a block diagram of an example computing environment, according to one or more embodiments.

The systems and processes described above may be performed on or between one or more computing devices, e.g. configuration service. FIG. 5 illustrates an example computing device. A computing device 500 may be a server, a computing device that is integrated with other systems or subsystems, a mobile computing device such as a smart phone, a cloud-based computing ability, and so forth. The computing device 500 may be any suitable computing device as would be understood in the art, including without limitation, a custom chip, and embedded processing device, a tablet computing device, a POS terminal associated with the merchant 110, a back-office system of a merchant 110, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 500 may include a processor 510 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 500 may also include one or more memories 530, for example read-only memory (ROM), random access memory (RAM), cache memory associated with the processor 510, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 500 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 510, or memories 530 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 540 may be configured to transmit to, or receive data from, other computing devices 500 across a network 560. The network and communication interfaces 540 may be, for example, an Ethernet interface, a radio interface, a Universal Serial Bus (USB)

interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 540 may include wire data transmission links such as Ethernet and TCP/IP. The communication interfaces 540 may include wireless protocols for interfacing with private or public networks 560. For example, the network and communication interfaces 608 and protocols may include interfaces for communicating with private wireless networks such as Wi-Fi network, one of the IEEE 802.11x family of networks, or another suitable wireless network. The network and communication interfaces 540 may include interfaces and protocols for communicating with public wireless networks 560, using for example wireless protocols used by cellular network providers, including Code Division Multiple Access (CDMA) and Global System for Mobile Communications (GSM). A computing device 500 may use network and communication interfaces 540 to communicate with hardware modules such as a database or data store, or one or more servers or other networked computing resources. Data may be encrypted or protected from unauthorized access.

In various configurations, the computing device 500 may include a system bus 610 for interconnecting the various components of the computing device 500, or the computing device 500 may be integrated into one or more chips such as programmable logic device or application specific integrated circuit (ASIC). The system bus 550 may include a memory controller, a local bus, or a peripheral bus for supporting input and output devices 520, and communication interfaces 560. Example input and output devices 520 include keyboards, keypads, gesture or graphical input devices, motion input devices, touchscreen interfaces, one or more displays, audio units, voice recognition units, vibratory devices, computer mice, and any other suitable user interface.

The processor 510 and memory 530 may include non-volatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for configuring a personal identification number (PIN) pads for microprocessor-enabled payment vehicles and contactless payment vehicles, the method comprising:

receiving, at an acquirer processor or independent software vendor (ISV) from a point of sale system over a computer network, a request to upgrade a PIN pad for reading at least one of a microprocessor-enabled payment vehicle and a contactless payment vehicle;

retrieving, from a PIN pad actor over the computer network, a PIN pad configuration hash value of the PIN pad, wherein the PIN pad actor provides a virtual representation of a PIN pad;

obtaining, using a configuration processor, current configuration information associated with the PIN pad configuration hash value from a PIN pad registry;

evaluating, using the configuration processor, whether the PIN pad can read at least one of the microprocessor-enabled payment vehicle and the contactless payment vehicle; and sending, upon determining that the PIN pad cannot read at least one of the microprocessor-enabled payment vehicle and the contactless payment vehicle, using the configuration processor, a notification to the ISV.

2. The method of claim 1, further comprising:

generating, upon determining that the PIN pad can read at least one of the microprocessor-enabled payment vehicle and the contactless payment vehicle, using the configuration processor, configuration instructions to upgrade the PIN pad for reading at least one of the microprocessor-enabled payment vehicle and the contactless payment vehicle;

sending, over the computer network, the configuration instructions to the PIN pad to upgrade the PIN pad for reading at least one of the microprocessor-enabled payment vehicle and the contactless payment vehicle; and configuring, using a hardware processor of the PIN pad, at least one of PIN pad readers to read and process at least one of the microprocessor-enabled payment vehicle and the contactless payment vehicle according to the configuration instructions.

3. The method of claim 2, further comprising:

updating, using the configuration processor, the PIN pad's current configuration information in the PIN pad registry;

generating, at the PIN pad registry, a new hash for the updated PIN pad configuration; and transmitting the new hash to the PIN pad to be stored at the PIN pad.

4. The method of claim 3, wherein the PIN pad registry stores the PIN pad's updated configuration information in a PIN pad database.

5. The method of claim 2, wherein the configuring the PIN pad comprises downloading and installing, over the computer network, drivers to enable PIN pad readers to read and process at least one of the microprocessor-enabled payment vehicle and the contactless payment vehicle according to the configuration instructions.

6. The method of claim 1, further comprising:

sending, upon determining that the PIN pad cannot read at least one of the microprocessor-enabled payment vehicle and the contactless payment vehicle, using the configuration processor, a notification to the point of sale system.

7. The method of claim 1, further comprising:

sending, upon determining that the PIN pad can and is configured to read at least one of the microprocessor-enabled payment vehicle and the contactless payment vehicle, using the configuration processor, a notification to the point of sale system that PIN pad is in a ready state.

8. A method for enabling a personal identification number (PIN) pads for microprocessor-enabled payment vehicles and contactless payment vehicles, the method comprising:

receiving, at an independent software vendor (ISV) from a point of sale system over a computer network, a request to enable a PIN pad configuration for reading at least one of a microprocessor-enabled payment vehicle and a contactless payment vehicle;

retrieving, from a PIN pad actor over the computer network, a PIN pad configuration hash value of the PIN pad, wherein the PIN pad actor provides a virtual representation of a PIN pad;

obtaining, using a configuration processor, current configuration information associated with the PIN pad configuration hash value from a PIN pad registry;

evaluating, using the configuration processor, whether the PIN pad is configured and disabled for reading at least one of the microprocessor-enabled payment vehicle and the contactless payment vehicle; and sending, upon determining that the PIN pad cannot read at least one of the microprocessor-enabled payment vehicle and the contactless payment vehicle, using the configuration processor, a notification to the ISV.

9. The method of claim 8, further comprising:
generating, upon determining that the PIN pad can read at least one of the microprocessor-enabled payment vehicle and the contactless payment vehicle, using the configuration processor, configuration instructions to upgrade the PIN pad for reading at least one of the microprocessor-enabled payment vehicle and the contactless payment vehicle;

sending, over the computer network, the configuration instructions to the PIN pad to upgrade the PIN pad for reading at least one of the microprocessor-enabled payment vehicle and the contactless payment vehicle;

enabling, using a hardware processor of the PIN pad, at least one of PIN pad readers to read and process at least one of the microprocessor-enabled payment vehicles and contactless payment vehicles according to the instructions; and accepting, at least one of the microprocessor-enabled payment vehicles and contactless payment vehicles at the enabled PIN pad.

10. The method of claim 9, further comprising:
updating, using the configuration processor, the PIN pad's current configuration information in the PIN pad registry;
generating, at the PIN pad registry, a new hash for the updated PIN pad configuration; and
transmitting the new hash to the PIN pad to be stored at the PIN pad.

11. The method of claim 8, further comprising:
sending, as a result of evaluating that the PIN pad is not configured for reading at least one of the microprocessor-enabled payment vehicle and the contactless payment vehicle, using the configuration processor, a notification to the point of sale system.

12. The method of claim 8, further comprising:
sending, as a result of evaluating that the PIN pad is enabled for reading at least one of the microprocessor-enabled payment vehicle and the contactless payment vehicle, using the configuration processor, a PIN pad ready status message to the point of sale system.

13. The method of claim 10, wherein the PIN pad registry stores the PIN pad's updated configuration information in a PIN pad database.

14. A computer system configuring a personal identification number (PIN) pads for microprocessor-enabled payment vehicles and contactless payment vehicles, the system comprising:

a memory; and
a configuration processor configured to:
receive, at an independent software vendor (ISV) from a point of sale system over a computer network, a request to upgrade a PIN pad configuration for reading at least one of a microprocessor-enabled payment vehicle and a contactless payment vehicle;

retrieve, from a PIN pad actor over the computer network, a PIN pad configuration hash value of the PIN pad, wherein the PIN pad actor provides a virtual representation of a PIN pad;

obtain, using a configuration processor, current configuration information associated with the PIN pad configuration hash value from a PIN pad registry;

evaluate, using the configuration processor, whether the PIN pad can read at least one of the microprocessor-enabled payment vehicle and the contactless payment vehicle; and send, upon determining that the PIN pad cannot read at least one of the microprocessor-enabled payment vehicle and the contactless payment vehicle, using the configuration processor, a notification to the ISV.

15. The system of claim 14, wherein the configuration processor is further configured to:
generate, upon determining that the PIN pad can read at least one of the microprocessor-enabled payment vehicle and the contactless payment vehicle, using the configuration processor, configuration instructions to upgrade the PIN pad for reading at least one of the microprocessor-enabled payment vehicle and the contactless payment vehicle;

send, over the computer network, the configuration instructions to the PIN pad to upgrade the PIN pad for reading at least one of the microprocessor-enabled payment vehicle and the contactless payment vehicle; and configure, using a hardware processor of the PIN pad, at least one of PIN pad readers to read and process at least one of the microprocessor-enabled payment vehicle and the contactless payment vehicle according to the configuration instructions.

16. The system of claim 15, wherein the configuring the PIN pad comprises downloading and installing, over the computer network, drivers to enable PIN pad readers to read and process at least one of the microprocessor-enabled payment vehicle and the contactless payment vehicle according to the configuration instructions.

17. The system of claim 14, wherein the configuration processor is further configured to:
send, upon determining that the PIN pad cannot be upgraded for reading at least one of the microprocessor-enabled payment vehicle and the contactless payment vehicle, using the configuration processor, a notification to the point of sale system.

18. The computer system of claim 14, wherein the configuration processor is further configured to:
send, upon determining that the PIN pad is enabled for reading at least one of the microprocessor-enabled payment vehicle and the contactless payment vehicle, using the configuration processor, a PIN pad ready status message to the point of sale system.

19. The computer system of claim 14, wherein the PIN pad registry stores the PIN pad's configuration information in a PIN pad database.

20. The computer system of claim 14, wherein the microprocessor-enabled payment vehicle is a payment card using a computer chip to authenticate transactions according to the Europay, MasterCard, and Visa (EMV) global standard.

* * * * *